US012425120B1

(12) United States Patent
Thommana et al.

(10) Patent No.: US 12,425,120 B1
(45) Date of Patent: Sep. 23, 2025

(54) MILITARY 5G USER EQUIPMENT

(71) Applicant: Rockwell Collins, Inc., Cedar Rapids, IA (US)

(72) Inventors: John V. Thommana, Cedar Rapids, IA (US); Raymond Zanoni, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 437 days.

(21) Appl. No.: 17/890,833

(22) Filed: Aug. 18, 2022

(51) Int. Cl.

| | |
|---|---|
| ***H04K 3/00*** | (2006.01) |
| ***H01Q 1/24*** | (2006.01) |
| ***H04B 7/0413*** | (2017.01) |
| ***H04B 7/06*** | (2006.01) |
| ***H04B 17/345*** | (2015.01) |
| ***H04W 24/02*** | (2009.01) |
| ***H04W 76/10*** | (2018.01) |

(52) U.S. Cl.
CPC ............. *H04K 3/224* (2013.01); *H01Q 1/245* (2013.01); *H04B 7/0413* (2013.01); *H04B 7/0691* (2013.01); *H04B 17/345* (2015.01); *H04W 24/02* (2013.01); *H04W 76/10* (2018.02)

(58) Field of Classification Search
CPC .. H02K 9/0081; H04B 1/3888; H04B 17/345; H01Q 1/12; H01Q 17/00; H01Q 19/04; H05K 9/0054; H05K 9/0071; H05K 9/006; H05K 9/00; H02H 9/04; H02H 9/06; H02H 9/041; H03H 11/34; H04W 76/10; H04K 3/224
See application file for complete search history.

(56) References Cited

U.S. PATENT DOCUMENTS

| | | | | |
|---|---|---|---|---|
| 4,673,943 | A | 6/1987 | Hannan | |
| 10,291,347 | B2 * | 5/2019 | Wang | H04B 1/715 |
| 11,290,143 | B1 * | 3/2022 | Sternowski | H05K 9/0081 |
| 11,394,453 | B2 * | 7/2022 | Ashworth | H04W 16/26 |
| 2007/0115864 | A1 * | 5/2007 | Bar-Ness | H04L 1/1867 370/278 |
| 2009/0103720 | A1 | 4/2009 | Narayanan | |
| 2010/0142628 | A1 | 6/2010 | Su | |
| 2010/0289688 | A1 | 11/2010 | Sherman et al. | |

(Continued)

FOREIGN PATENT DOCUMENTS

| | | | |
|---|---|---|---|
| CA | 2469208 | C | 6/2003 |
| JP | 10288659 | A * | 10/1998 |
| JP | 2021136573 | A * | 9/2021 |

OTHER PUBLICATIONS

Lee, Design of a Microstrip Patch Array Antenna, IEEE, 2009 (Year: 2009).*

(Continued)

*Primary Examiner* — Jinsong Hu
*Assistant Examiner* — Justin Barry
(74) *Attorney, Agent, or Firm* — Suiter Swantz IP

(57) ABSTRACT

A system includes an enclosure and antennas disposed within the enclosure to interact with antennas in a cellular device. A processor received signals from the cellular device antennas and provides cellular connectivity to local base stations via a set of antennas external to the enclosure. The processor identifies interference, or receives data about interference, and configures the antennas external to the enclosure to overcome the interference.

14 Claims, 11 Drawing Sheets

(56) References Cited

U.S. PATENT DOCUMENTS

| | | | | |
|---|---|---|---|---|
| 2012/0309472 | A1* | 12/2012 | Wong | H01Q 5/371 455/575.5 |
| 2014/0035783 | A1 | 2/2014 | Contarino et al. | |
| 2018/0269919 | A1* | 9/2018 | Gharavi | H04B 7/10 |
| 2020/0313725 | A1* | 10/2020 | Abdulai | H04B 17/0085 |
| 2021/0050905 | A1* | 2/2021 | Oh | H04B 17/318 |
| 2021/0302528 | A1* | 9/2021 | Wang | G01S 3/46 |
| 2021/0344437 | A1* | 11/2021 | Baracca | H04J 11/0023 |

OTHER PUBLICATIONS

Tethering, https://www.geeksforgeeks.org/understanding-tethering-network/, 2020 (pulled from wayback.org with publishing date of Jun. 17, 2021) (Year: 2020).*

* cited by examiner

700

MILITARY 5G USER EQUIPMENT

BACKGROUND

In a tactically contested environment, commercial cellular phones can be easily jammed or suffer interference. The control channel structures used in 4G and 5G are not designed to operate in the presence of intentional jamming. Requiring anti-jamming features in cellular phones is incompatible with the economy of scale model. Cellular devices are small, light, and supports operations in frequency bands ranging from 800 MHZ to 7.1 GHz in the FR1 band and millimeter wave bands. Delivering all of the capabilities provided by a commercial cellular phone in a size, weight, power, and cost (SWaP-C) constrained package is difficult; existing devices do not have sufficient antennas. High performance antenna characteristics (e.g., effective isotropic radiated power (EIRP) and beam widths) can be implemented into cellular base stations which do not have such tight SWAP-C constraints.

Tactical military communication environments include jamming sources that may target cellular devices for denial of access. Because of the small number of antennas in the cellular device, and because they are not designed to reject jamming signals, denial of access for cellular devices is easily accomplished by jamming the 4G/5G synchronization/control channels.

It would be advantageous to have a system and method for using commercial cellular phones in an environment with intentional jamming.

SUMMARY

In one aspect, embodiments of the inventive concepts disclosed herein are directed to a system with an enclosure and antennas disposed within the enclosure to interact with antennas in a cellular device. A processor received signals from the cellular device antennas and provides cellular connectivity to local base stations via a set of antennas external to the enclosure.

In a further aspect, the processor identifies interference, or receives data about interference, and configures the antennas external to the enclosure to overcome the interference.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
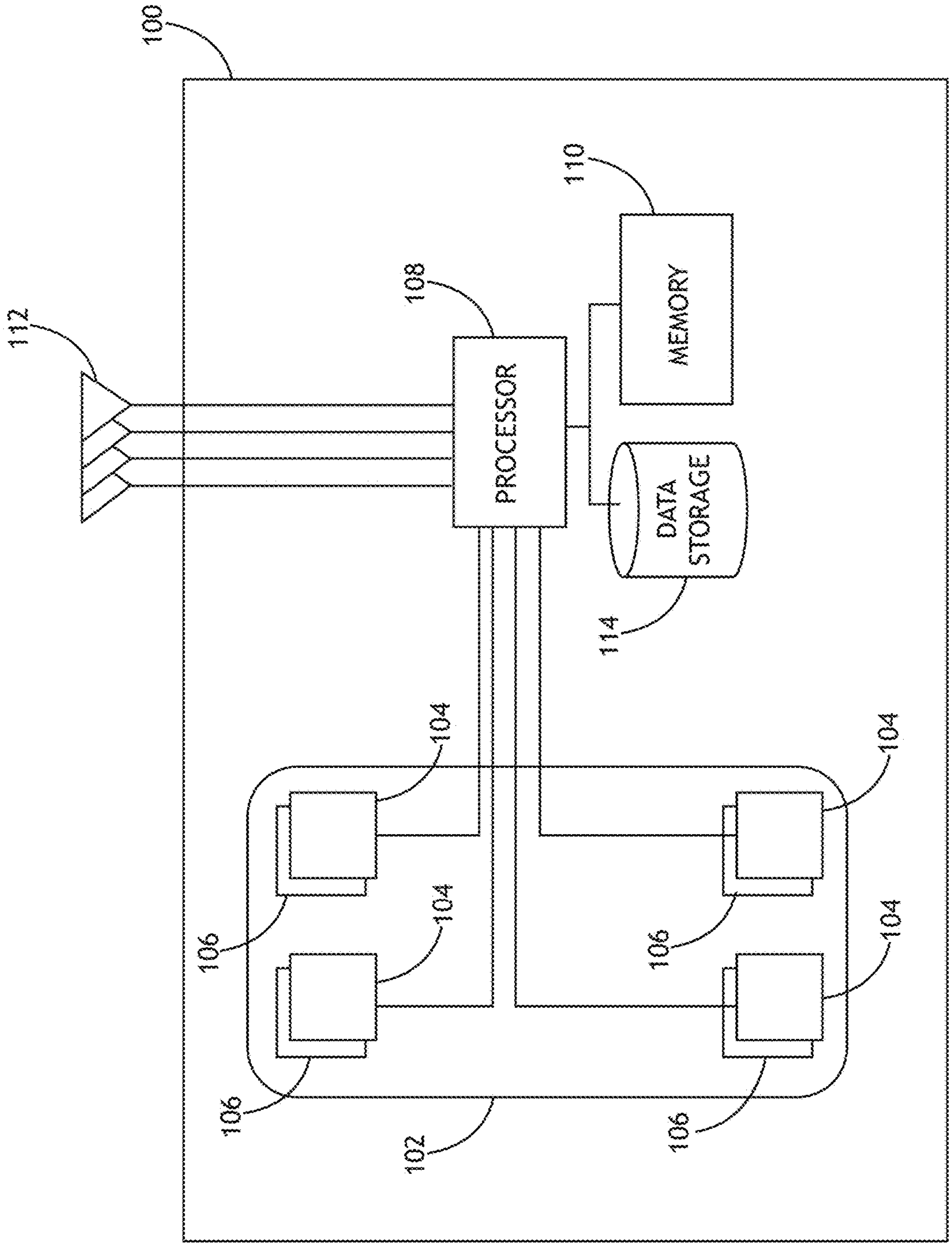
FIG. 1 shows a block diagram of a system to enable cellular connectivity with jamming protection according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement.

Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system with an enclosure and antennas disposed within the enclosure to interact with antennas in a cellular device. A processor received signals from the cellular device antennas and provides cellular connectivity to local base stations via a set of antennas external to the enclosure. The processor identifies interference, or receives data about interference, and configures the antennas external to the enclosure to overcome the interference.

Referring to FIG. 1, a block diagram of a system to enable cellular connectivity with jamming protection according to an exemplary embodiment is shown. The system includes an enclosure 100 to hold a cellular device 102 and exclude external signals generally, or within a range defined by the operating frequency of the cellular device 102 (i.e., a Faraday cage). The enclosure 100 includes a plurality of internal antennas 104 (e.g., patch antennas), each disposed proximal to cellular device antennas 106, and configured to interact with the proximal cellular device antenna 106 to transfer signals between the cellular device 102 and a processor 108 connected to the internal antennas 104. A typical cellular device 102 may include four antennas and can support 4×4 Multiple-Input Multiple-Output (MIMO) even at frequencies as low as 700 MHZ. The beamformed antenna beam width during 4×4 MIMO is on the order of 90 degrees; an interceptor may easily localize the cellular device 102 both from main lobe emissions and side lobe emissions. Interceptors using cyclostationary techniques can reliably detect a 5G signal 10 to 20 dB below demodulation ability, potentially increasing the reach of the interceptor beyond the base station.

The processor 108 is configured via processor executable code stored in a memory 110 to send and receive signals to and from the internal antennas 104, and communicate with local cellular base stations via a plurality of external antennas 112. The external antennas 112 are external to the enclosure 100, and are therefore not affected by the signal excluding features of the enclosure 100. Applications on the cellular device 102 may interact with a cellular network defined by local cellular base stations as if the cellular device 102 were in direct data communication with the local cellular base stations.

In at least one embodiment, the number of external antennas 112 in the system is some multiple of the number of cellular device antennas 106. The multiplication factor may be anywhere between 2 and 32. In at least one embodiment, the external antennas 112 may comprise both dedicated transmit antennas and dedicated receive antennas. For example, the system may include eight transmit external antennas 112 and eight receive external antennas 112 which enables the processor to place a narrower beam (e.g., 45 degrees) aimed toward a base station while still being able to place nulls in the direction of jamming source signals. In at least one embodiment, the external antennas 112 may comprise a transmit and receive 8-element antenna array deployed as a linear 8-element antenna array or in groups of two to support 4×4 MIMO in Frequency Division Duplex (FDD) mode. Alternatively, switching circuitry may switch each external antenna 112 into a transmit or receive mode according to the operation of the processor 108. In time division duplex (TDD) mode, an 8-element antenna array may function as the equivalent of a linear 16-element array or 4-elements per antenna to support 4×4 MIMO.

Increasing the number of transmit and receive external antennas 112 increases the size of the enclosure 100. The dimensions of the system can become large and unwieldy, especially if supporting operations as low as 600 MHZ. In at least one embodiment, the operational frequency band of the system may be restricted to a range between 2.0 GHz and 7.1 GHz.

In at least one embodiment, the processor 108 is configured to identify interference (e.g., jamming signals). The processor 108 may periodically or continuously determine a frequency range and/or a direction of an interference source via the external antennas 112. The processor 108 may then determine signals to apply to the external antennas 112 to create one or more nulls corresponding to the direction of the interference source while passing RF signals to the cellular device antennas 106.

In at least one embodiment, a 5G deployment may utilize uplink frequencies between 2500-2570 MHz and down link frequencies between 2630-2690 MHz. 5G may be deployed in FDD mode and channel bandwidths of 5, 10, 15, 20, 25, 30, 35, 40, and 50 MHz may be supported. In an exemplary 20 MHz deployment in FDD mode, emissions coming from base stations and cellular devices 102 can be separated to distinguish the emission from the base stations from jamming sources.

In at least one embodiment, in TDD mode, emissions from many cellular devices 102 increases computational load. The processor 108 may be configured to detect signals that are transmitted only by the base station such as a 5G primary synchronization signal (PSS) and/or secondary synchronization signal (SSS). In at least one embodiment, situational awareness data transported over military waveforms (e.g., Link-16, TTNT, and the like) can be augmented to include locations of the base stations and known jamming sources to reduce the computational load on the processor 108; such situational awareness data may be stored in a data storage element 114 for later reference. Limiting signal detection may also address jamming source spoofing/replaying base station signals in both FDD and TDD modes.

One mechanism to the cellular device 102 is to deny the cellular device 102 access to the PSS (comprising about 0.1% of resource elements in the resource grid), SSS (about 0.3% of resource elements), and physical broadcast channel demodulation reference signal (PBCH DM-RS) (about 0.4% of resource elements). The jamming source generates high-level noise at appropriate times such that the cellular device 102 cannot successfully detect these signals. Most of these signals are detected using correlation peak search, so spoofing of these signals by the jamming source may also cause denial of service. Jamming sources typically do not spoof entire orthogonal frequency division multiplexing (OFDM) frames but may do so to counter jamming mitigation procedures.

Figure 2:
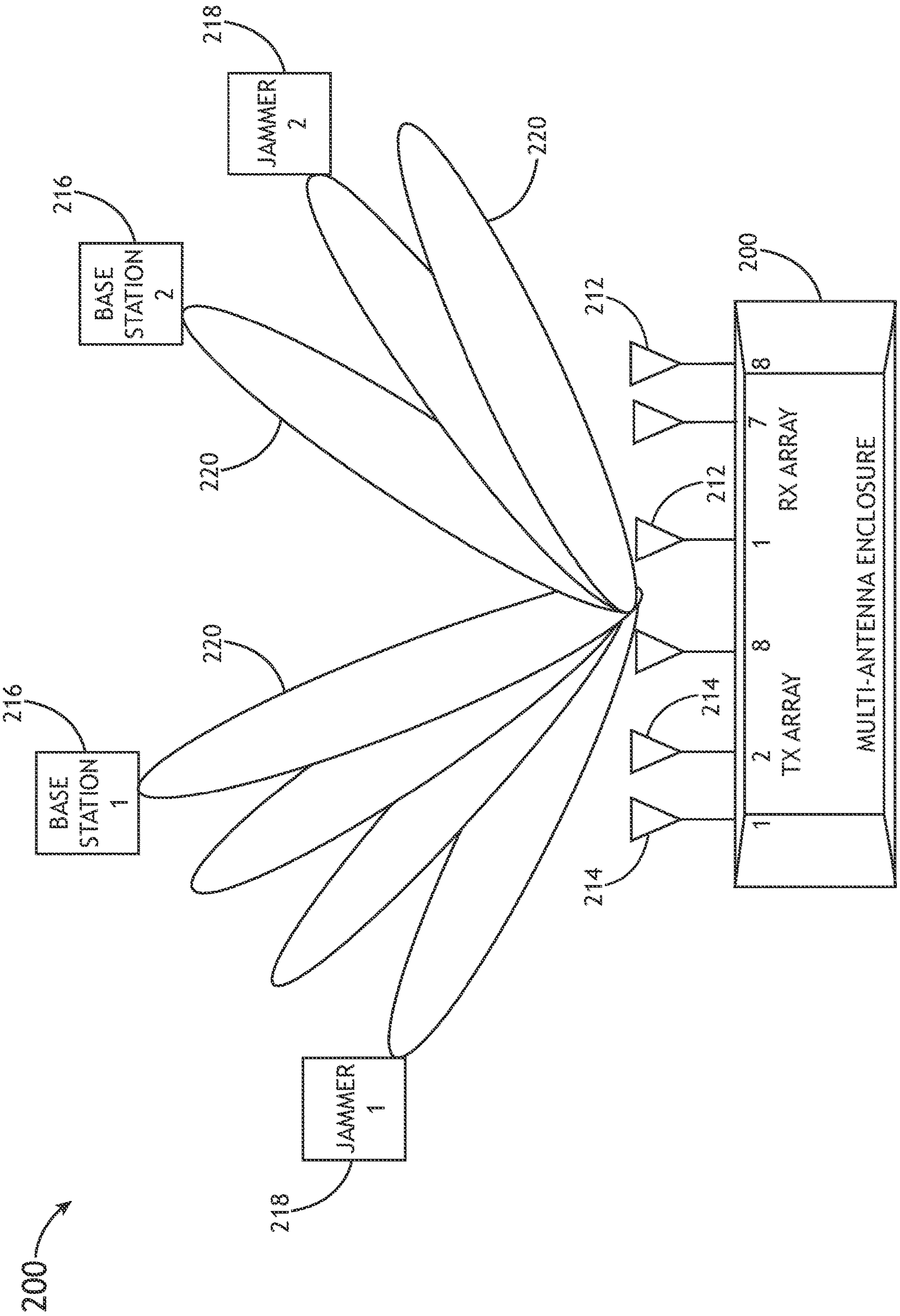
FIG. 2 shows a block diagram of a system for multi-antenna scanning to detect base stations and interfering signals according to an exemplary embodiment.

Referring to FIG. 2, a block diagram of a system for multi-antenna scanning to detect base stations and interfering signals according to an exemplary embodiment is shown. The system includes an enclosure 200 to hold a cellular device, and may include an 8-element transmitter element 214 external antenna and 8-element receiver element 212 external antenna, all external to the enclosure 200. RF signal processing within the enclosure 200 enables the enclosure 200 to expose only a subset of the actual RF emissions 220 seen by the antennas 212, 214. The external antennas may be generally higher quality and more numerous that the antennas native to the cellular device in the enclosure 200; the better, more numerous external antennas permit the enclosure 200 to push more energy towards base stations 216 by reducing the beamwidth as well as put nulls in the direction of the jamming sources 218 both while receiving and while transmitting.

A processor in the enclosure 200 and in data communication with the external antenna elements 212, 214 may utilize one or more of a plurality of processing algorithms (e.g., Multiple Signal Classification (MUSIC)) to estimate the direction of arrival of multiple signal sources 216, 218 using the external antenna arrays. The MUSIC algorithm does not make any assumptions about the array geometry; a linear external antenna array may be used to detect base stations 216 and jamming sources 218. Furthermore, the linear external antenna array may utilize a standard OFDM synchronization algorithm to distinguish between OFDM base stations 216 and noise Jamming sources 218.

Alternatively, or in addition, the processor may implement an estimation of signal parameters via rotational invariance technique (ESPRIT) algorithm. ESPRIT is a fast and efficient algorithm that can determine the direction of arrival of multiple signal sources 216, 218 using less memory and processing resources than MUSIC.

Multiple algorithms can be utilized to reliably locate multiple signal sources 216, 218 such as 5G base stations 216 and noise jamming sources 218 using antenna arrays.

Figure 3:
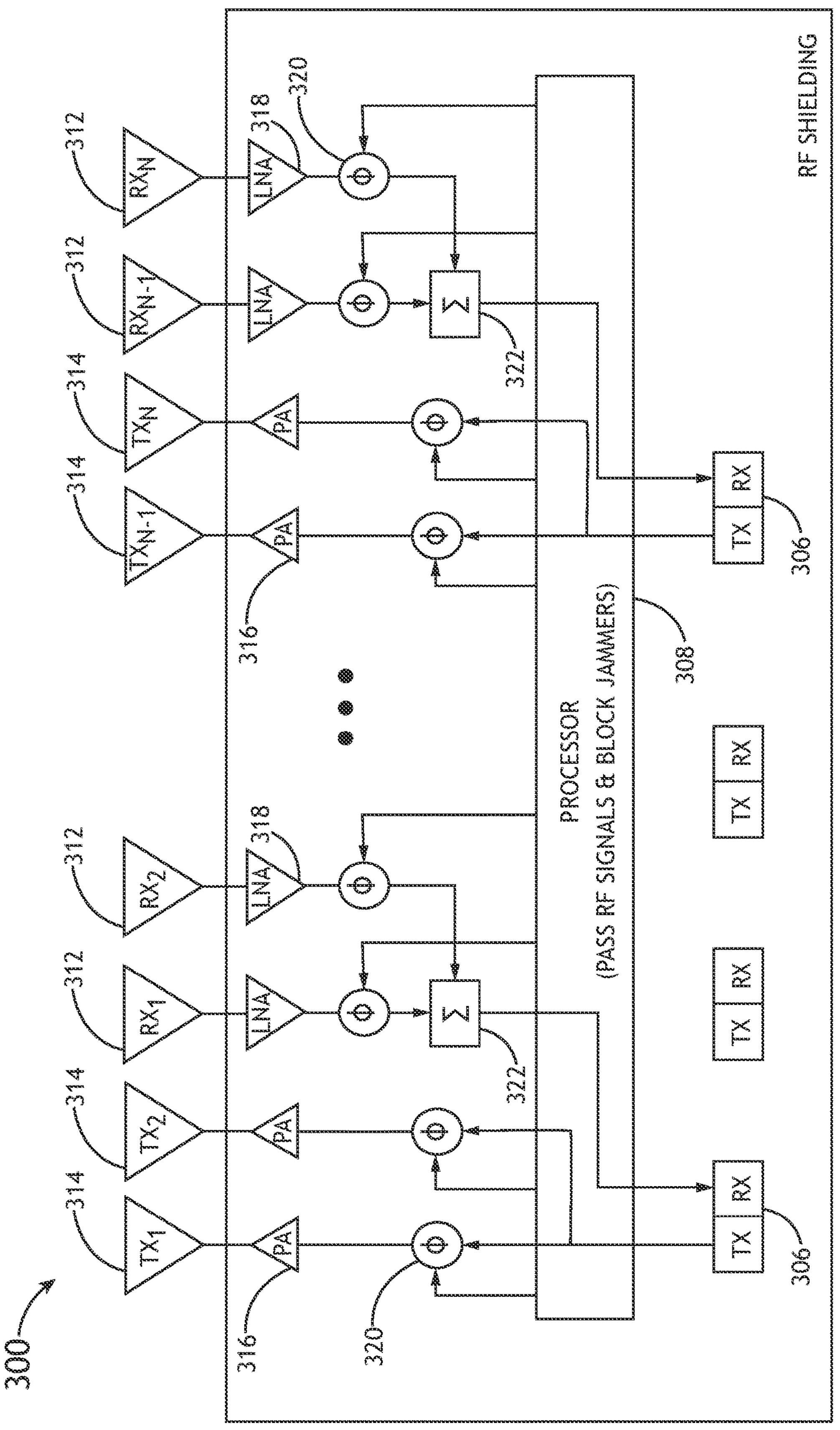
FIG. 3 shows a block diagram of a multi antenna enclosure according to an exemplary embodiment.

Referring to FIG. 3, a block diagram of a multi antenna enclosure 300 according to an exemplary embodiment is shown. In a FDD mode external transmit antennas 314 and external receive antennas 314 are in data communication with antenna pairs (transmit and receive) of a cellular device. In a localization mode a processor 308 processes the output of the external receive antennas 312 to determine all signal sources (e.g., base stations and jamming sources). Using traditional angle of arrival estimation algorithms such as MUSIC and ESPRIT, the processor 308 determines an angular location of the signal sources with respect to the enclosure 300. In at least one embodiment, each external transmit antenna 314 may be associated an amplifier 316 and each external receive antenna 312 may be associated with a low-noise amplifier 318.

The external receive antenna 312 may be pointed to each unidentified source (e.g., via signals to create a radiation pattern favoring the direction of the unidentified source) and the processor 308 determines whether each signal source is a base station or jamming source. In at least one embodiment, where the system is provided with situational awareness data that identifies some or all base stations and some or all jamming sources, the processor 308 may designate the identified sources appropriately and determine the identity of any sources that were not the subject of situational awareness data.

Once the location of base stations and jamming sources is known, the processor 308 may apply signals to each of the external receive antennas 312 to create a phase shift in the external receive antennas 312, weighted appropriately such that the external receive antennas 312 produce a radiation pattern with nulls in the direction of the jamming sources. This signal is then fed to the cellular device in the enclosure 300.

In at least one embodiment, input signals from each cellular device antenna are replicated by an appropriate factor. For example, in the case where the enclosure 300 includes eight external transmit antennas 314 and eight external receive antennas 312, the input signals may be replicated by a factor of two. The phases of the external transmit antennas 314 are weighted appropriately to produce nulls in the direction of the jamming sources.

In at least one embodiment, the processor 308 may not be able to determine which base station the cellular device is communicating with. In such embodiments, the processor 308 may configure the external antennas 312, 314 via appropriate phase shifting to produce a very broad radiation pattern, but including nulls in the direction of known jamming sources. If the processor 308 is provided with additional information (e.g., a base station identifier), then the processor 308 may perform an appropriate and produce a narrower beam only in the direction of the desired base station. A narrowly defined beam provides an additional factor of low probability of interference/low probability of detection (LPI/LPD) because the emissions are tightly directed only towards the intended base station and nulls placed in the direction of the jamming sources to reduce emissions in the direction of the jamming sources.

In a TDD mode, both the external transmit antennas 314 and external receive antennas 312 may be tuned to the same frequency. Additional circuitry (e.g., phase modulators 318, modulators/demodulators 320, etc.) is provided to detect the power ramp up during transmit and the appropriate set of antennas are picked.

Referring to FIGS. 4-8, a block diagram of cellular data frames 400, 402 and various graphs of signal strengths during a multi-signal detection process according to an exemplary embodiment are shown. In one exemplary embodiment, an 8-element linear external antenna array may be spaced apart to detect 5, 4, and 3 simultaneous signal sources. The operational signal-to-noise ratio may be 5 dB and each signal source is a 5G base station using a 1024 subcarrier OFDM frame 400 except for one jamming data source. Each OFDM frame 400 includes a preamble 404 followed by five data payloads 406. Each signal source is at a different distance from the antenna array represented by different symbol_timing offsets (STO) 408 for each base station. The jamming source may be interpreted as random complex Gaussian Noise samples.

Figure 4:
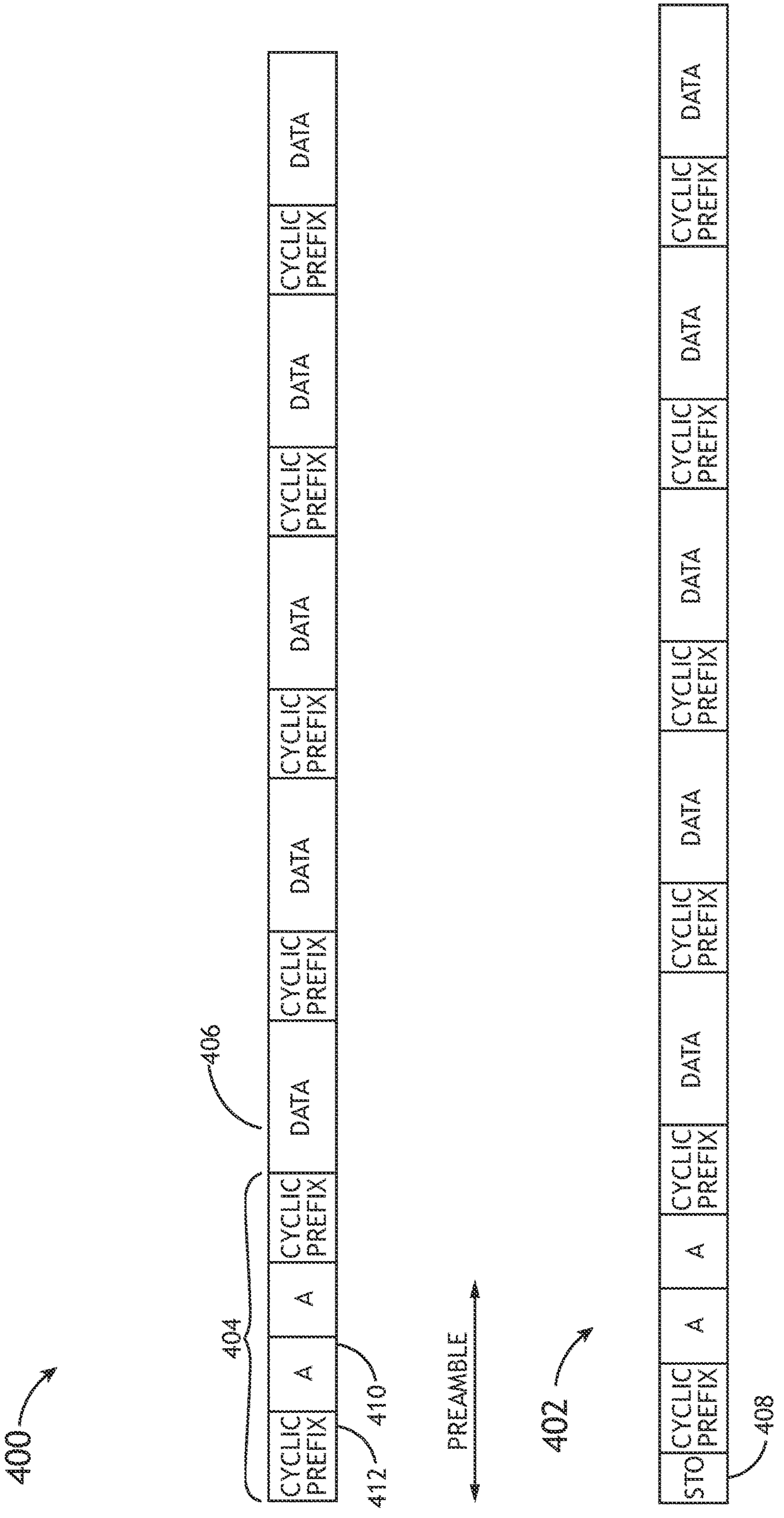
FIG. 4 shows a block diagram of cellular data frames.
Figure 5:
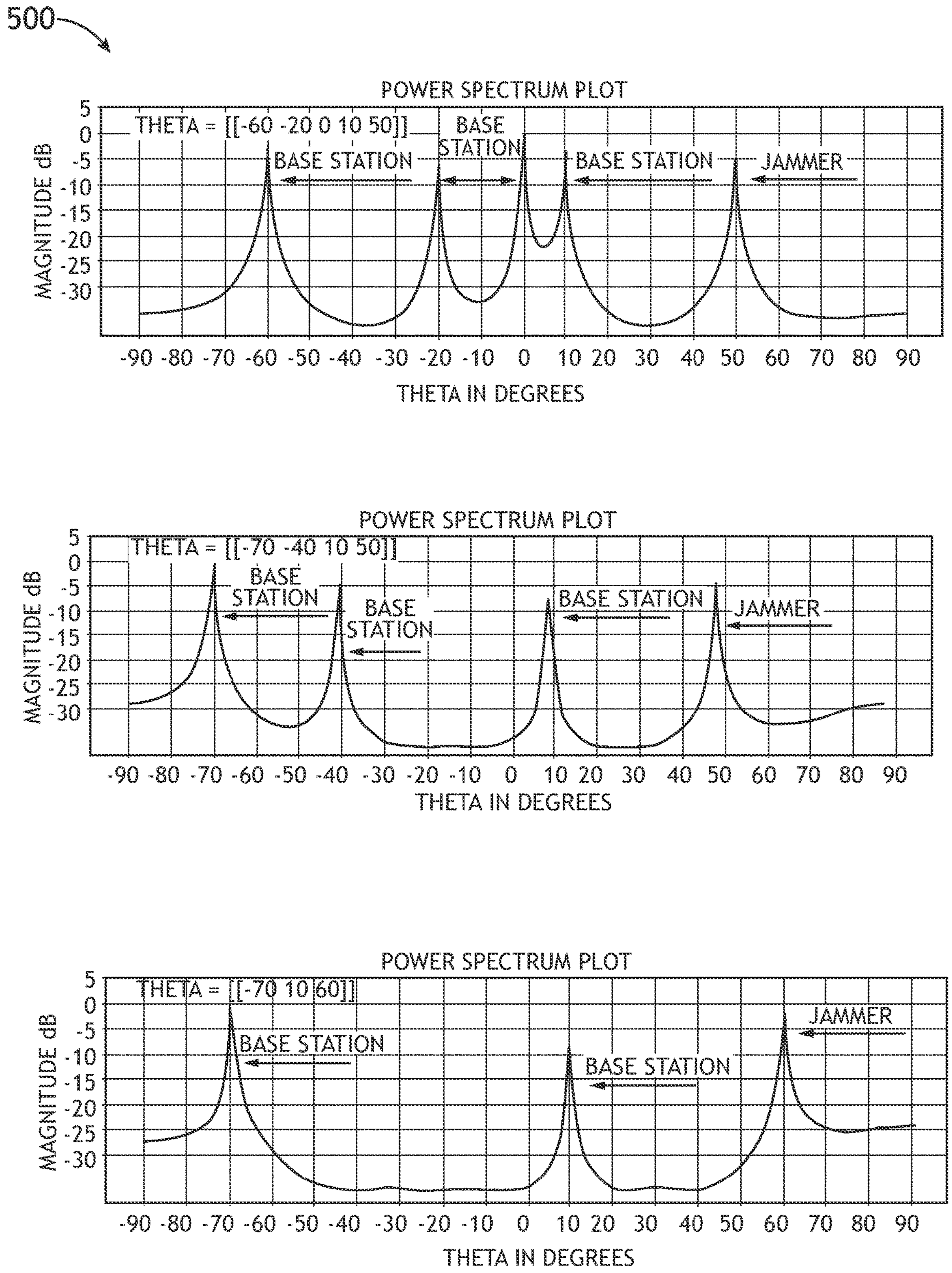
FIG. 5 shows various graphs of signal strengths during a multi-signal detection process according to an exemplary embodiment.

For each of the simultaneous signal sources as described with respect to FIG. 4, the MUSIC algorithm is shown to reliably detect all signal sources. The 4G/5G OFDM frame 400 employs a unique preamble 404 that enables rapid synchronization and extraction of payload symbols. The preamble contains two repeated parts 410 prepended by the cyclic prefix 412. Detecting a plateau caused by the cyclic prefix is one aspect in aiding synchronization.

Figure 6:
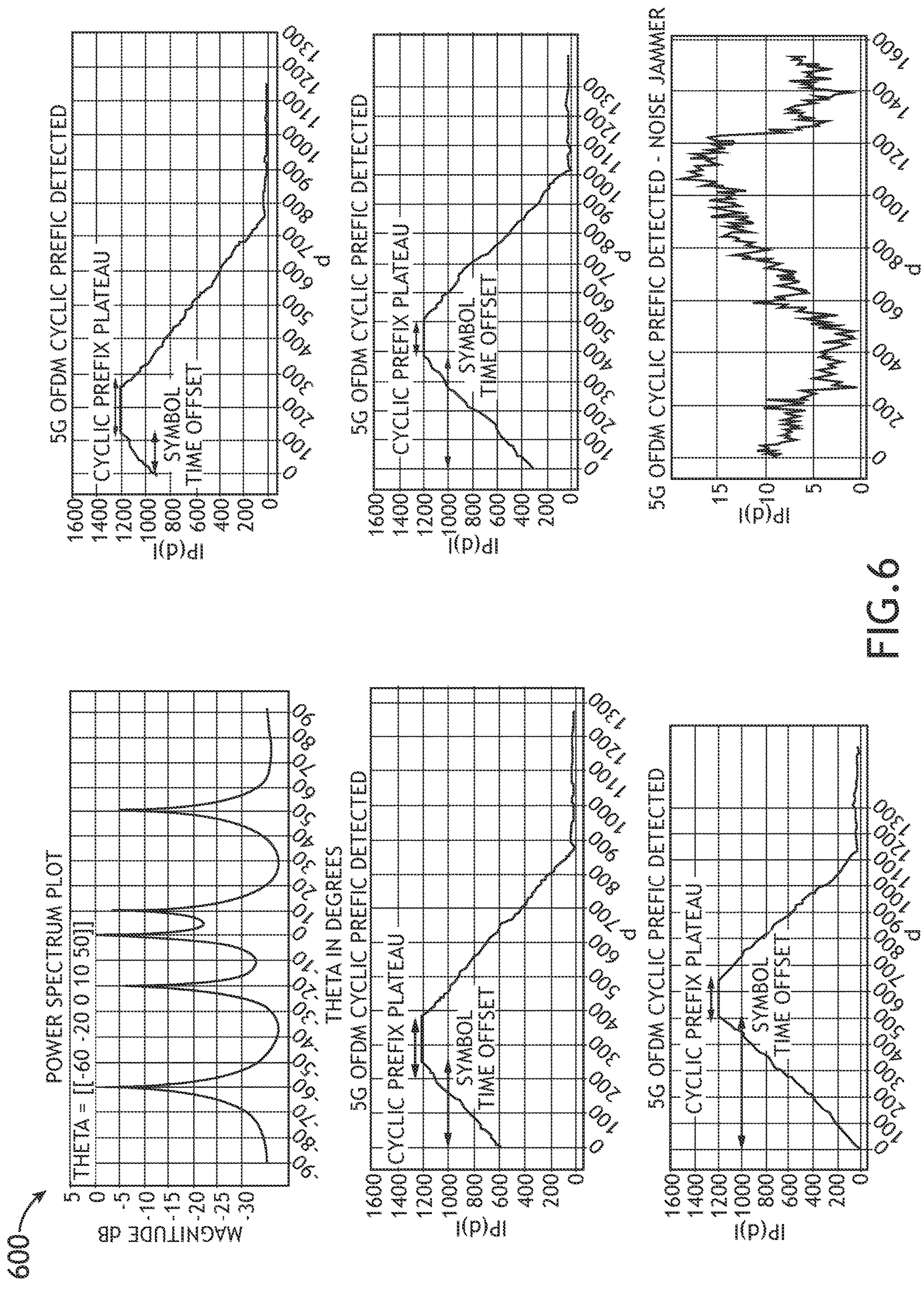
FIG. 6 shows various graphs for simultaneous detection of base stations and jamming sources according to an exemplary embodiment.

FIG. 6 illustrates the results of simultaneously detecting five signal sources (four base stations and one gaussian noise jamming source). The signal sources are located at various angles specified by theta. The MUSIC algorithm reliably detects all five signal sources. Each signal source may then be passed through a synchronization algorithm. One metric of successfully detecting the 5G Base Stations is detecting the cyclic prefix 412 plateau. The noise jamming source is identified by the absence of the cyclic prefix 412 plateau.

As long as the Jamming source does not spoof an OFDM frame 400, the algorithm can reliably detect one or more jamming sources along with a precise direction of arrival (theta) with respect to the externa antenna array. Availability of tactical situational awareness data may be used as a supplementary aid to locate the tactical base stations and isolate jamming sources that spoof a base station or commercial base stations which are not part of the tactical cellular network.

Figure 7:
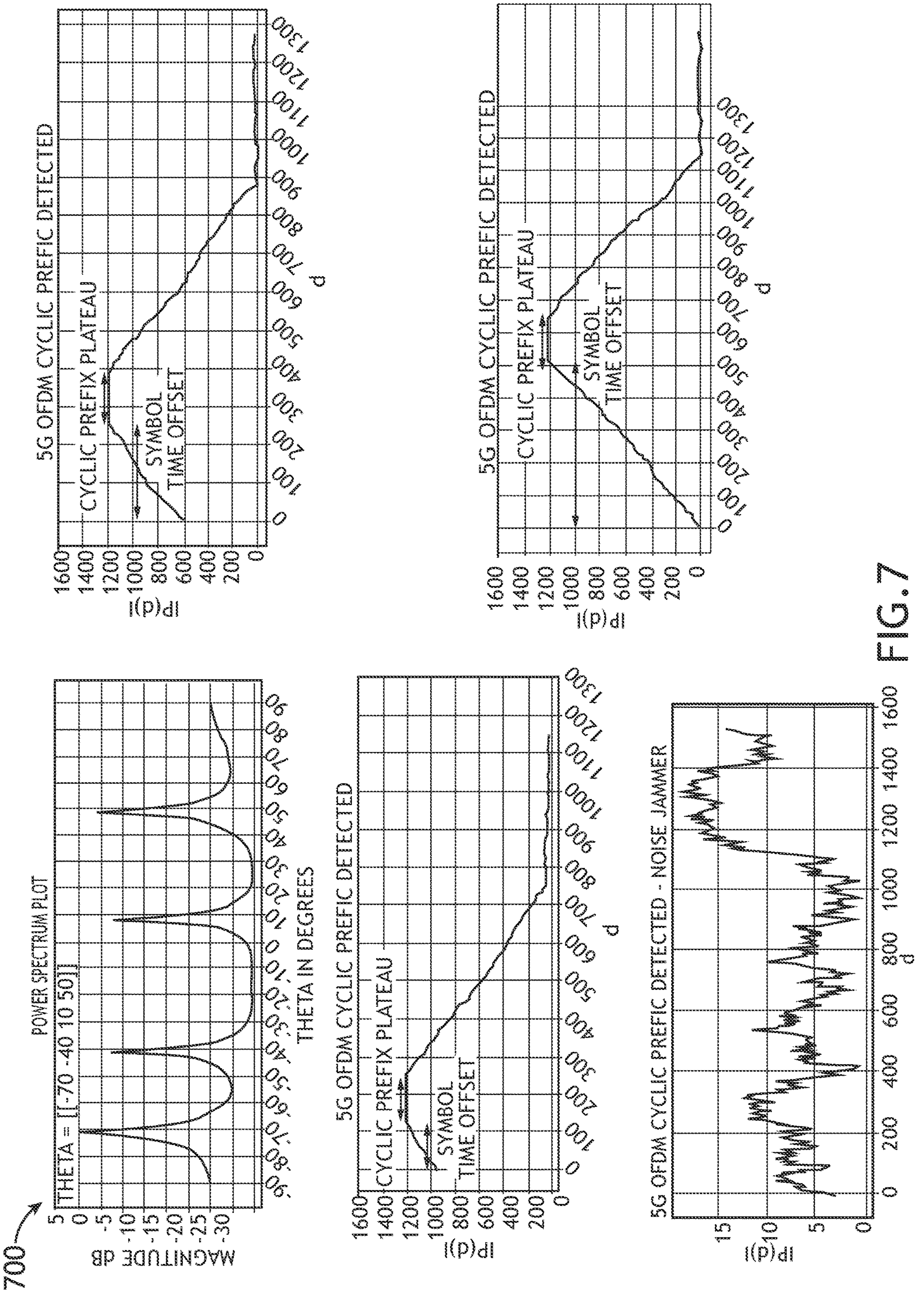
FIG. 7 shows various graphs for simultaneous detection of base stations and jamming sources according to an exemplary embodiment.
Figure 8:
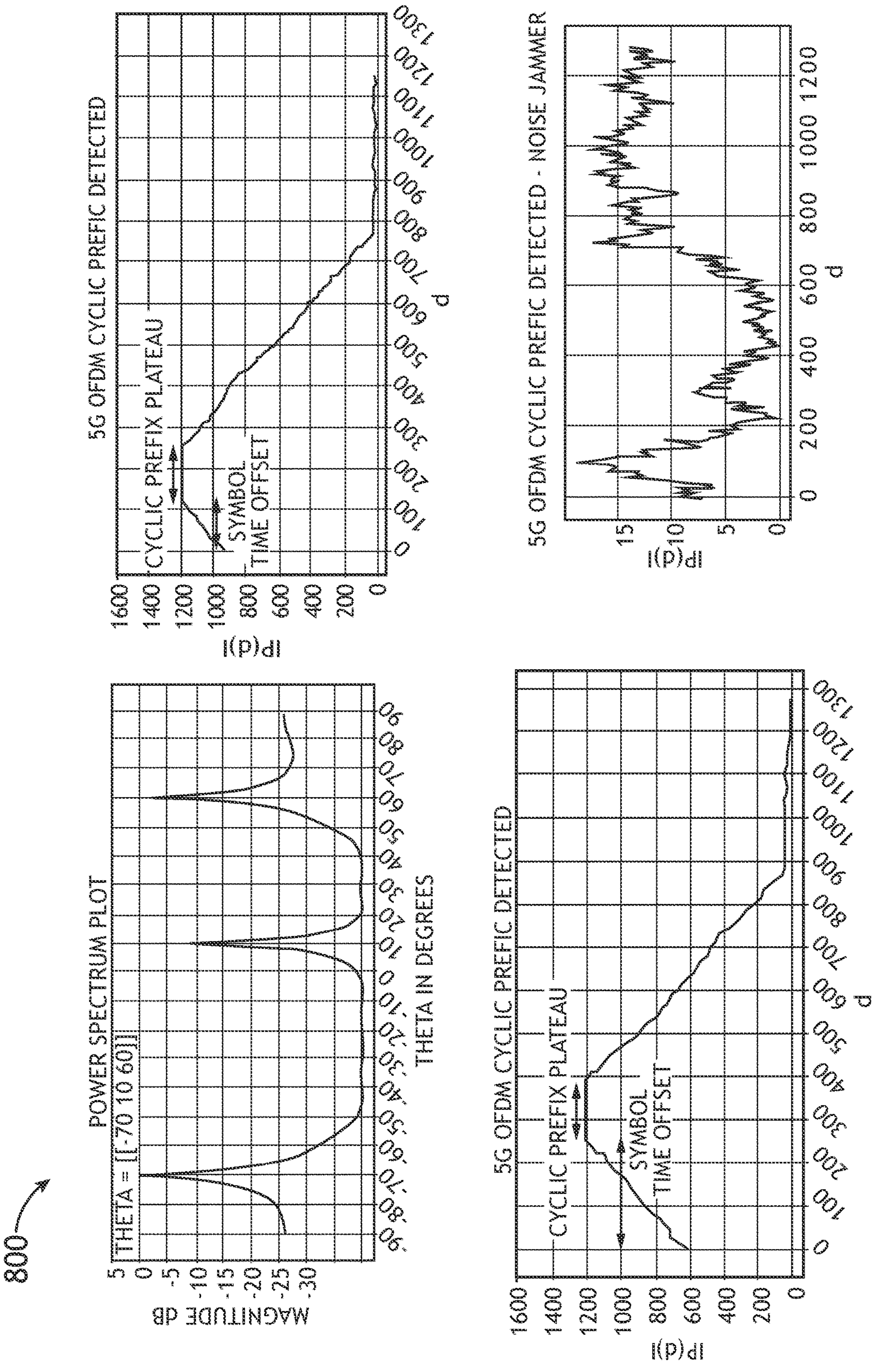
FIG. 8 shows various graphs for simultaneous detection of base stations and jamming sources according to an exemplary embodiment.

Similarly, FIG. 7 illustrates a similar situation in a network with three base stations and one jamming source; and FIG. 8 illustrates a similar situation in a network with two base stations and one jamming source.

Figure 9:
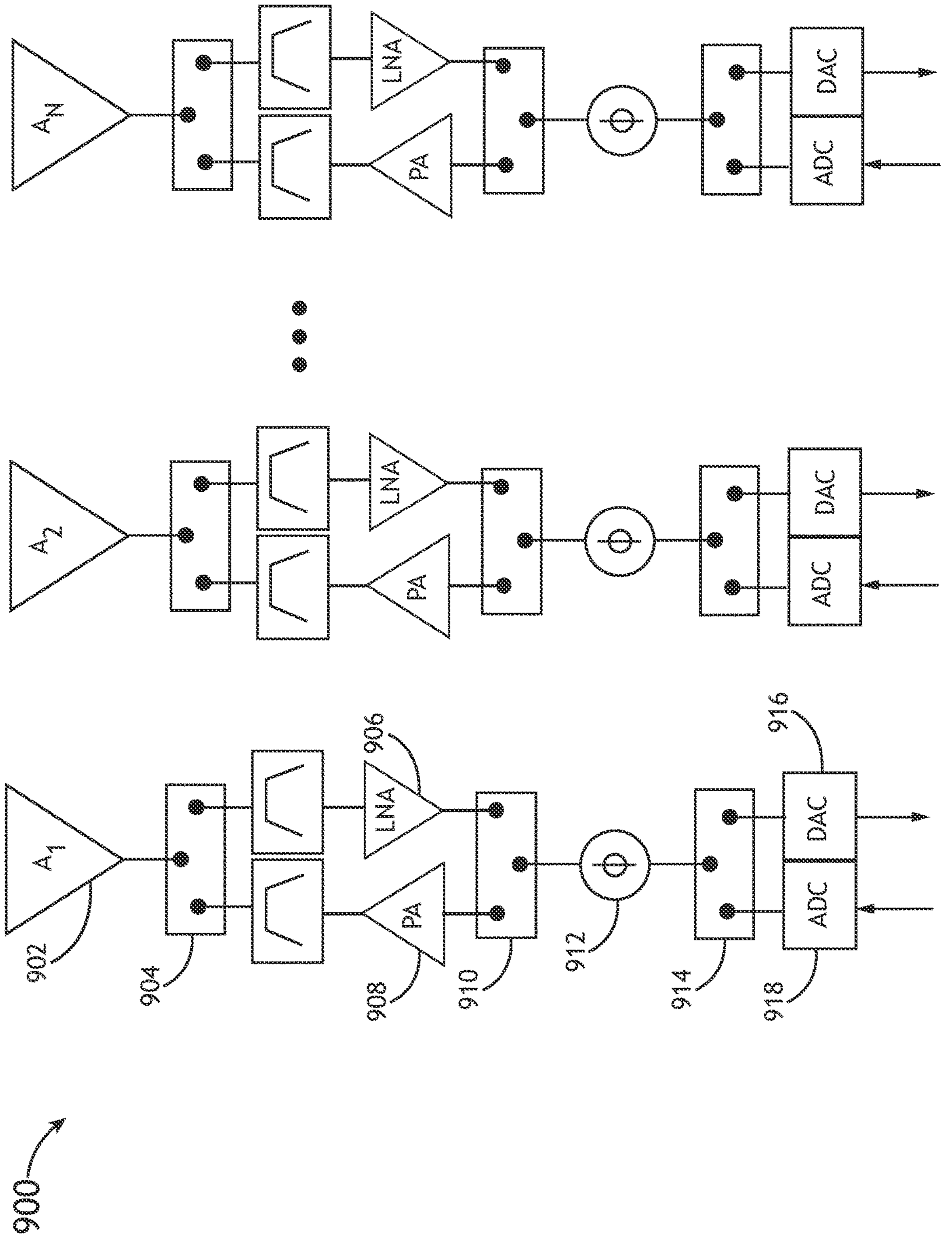
FIG. 9 shows antenna configurations useful for exemplary embodiments.

Referring to FIG. 9, antenna 900 configurations useful for exemplary embodiments are shown. The antenna 900 includes a radiating element 902 fed by a radiator switch 904 in electronic communication with a power amplifier 908 and a low-noise amplifier 906. The power amplifier 908 and low-noise amplifier 906 are fed by an amplifier switch 910. The amplifier switch 910 receives signals from a phase modulator 912, and the phase modulator 912 sends and receives signals from a phase switch 914. The phase switch 914 may send and receive signals from an analog-to-digital converter and a digital-to-analog converter.

In at least one embodiment, each of the radiator switch 904, amplifier switch 910, and phase switch 914 are configured to switch between a transmit state and a receive state. In the transmit state, each antenna 900 is configured to receive signals a corresponding analog-to-digital converter 918, phase modulate the signal such that all of the antennas 900 working in concert produce a radiation pattern with nulls directed toward jamming sources. Phase modulated signals are amplified via a power amplifier 908 and transmitted by the radiating element 902. In the receive state, each antenna 900 is configured to receive signals via the radiating element 902; the signals are amplified via a low-noise amplifier 906 and converted via a digital-to-analog converter 916. The radiating element 902 may be configured to with nulls corresponding to jamming sources via signals from corresponding phase modulators 912.

Embodiments of the present disclosure enable dynamic allocation of a variable number of antennas 900 for transmit and receive functions. If the jamming source is jamming the cellular device during base station transmissions, a processor may allocate more resources for receive; conversely, if the jamming source is jamming the base station when the cellular device is transmitting, the processor can allocate more antenna elements to transmit. Embodiments enable tradeoff between antenna gain (narrower beam width) and/or null placement.

Figure 10:
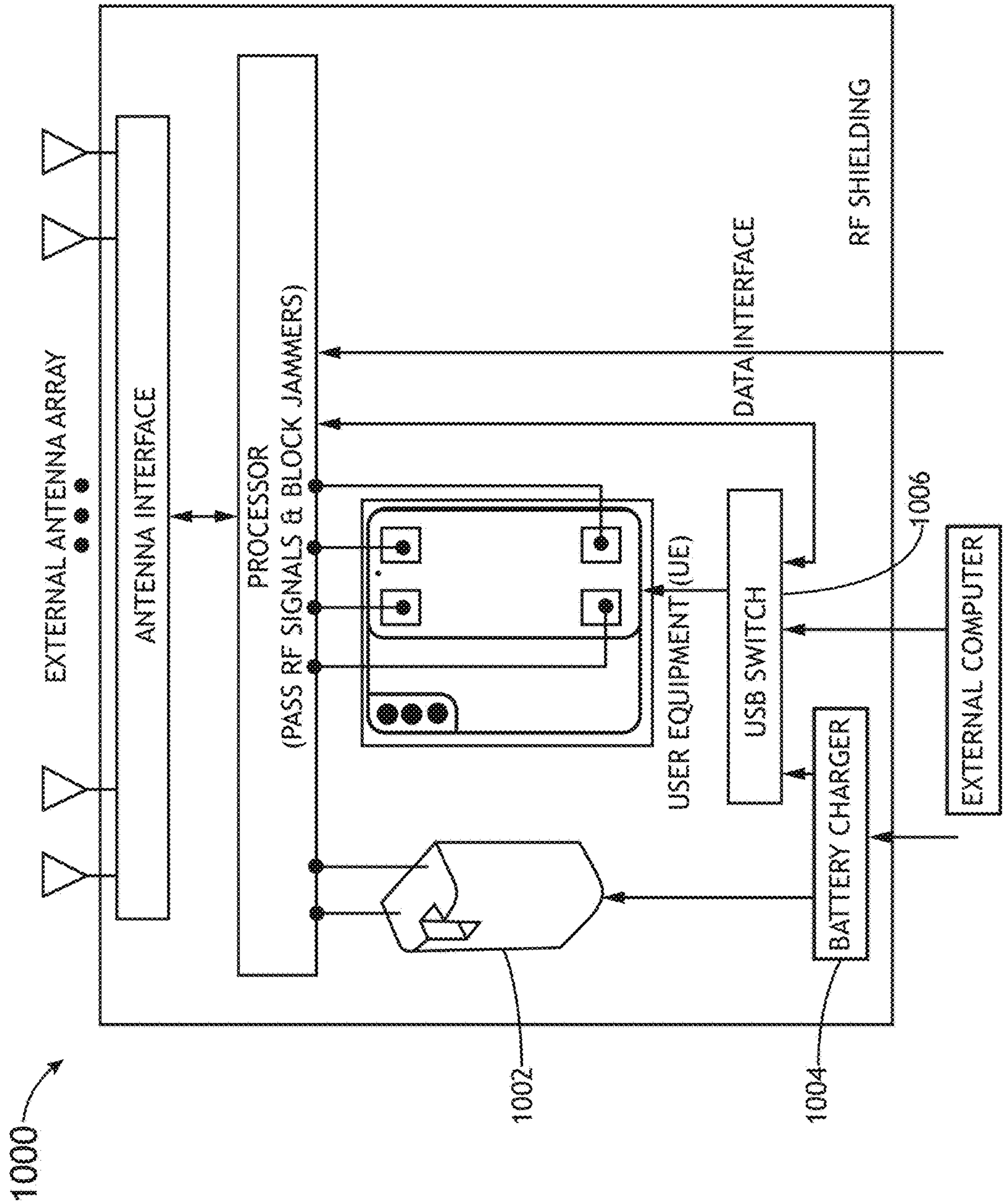
FIG. 10 shows a block diagram of a system to enable cellular connectivity with jamming protection according to an exemplary embodiment.

Referring to FIG. 10, a block diagram of a system to enable cellular connectivity with jamming protection according to an exemplary embodiment is shown. In at least one embodiment, an enclosure 1000 includes a re-chargeable battery 1002 that can power processor and external antennas for the required mission duration. a common enclosed battery charger 1004 can charge re-chargeable battery 1002 as well as the cellular device battery. A USB switch 1006 may be used to connect the cellular device to the battery charger 1004 or an external computer to allow a user to utilize the cellular communication functions of the cellular device within the enclosure 1000. The cellular device may function as a cellular modem for an external computer; applications on the external computer may initiate voice and/or data communication using standard AT command, android APIs, or any other interface supported by the cellular device.

Figure 11:
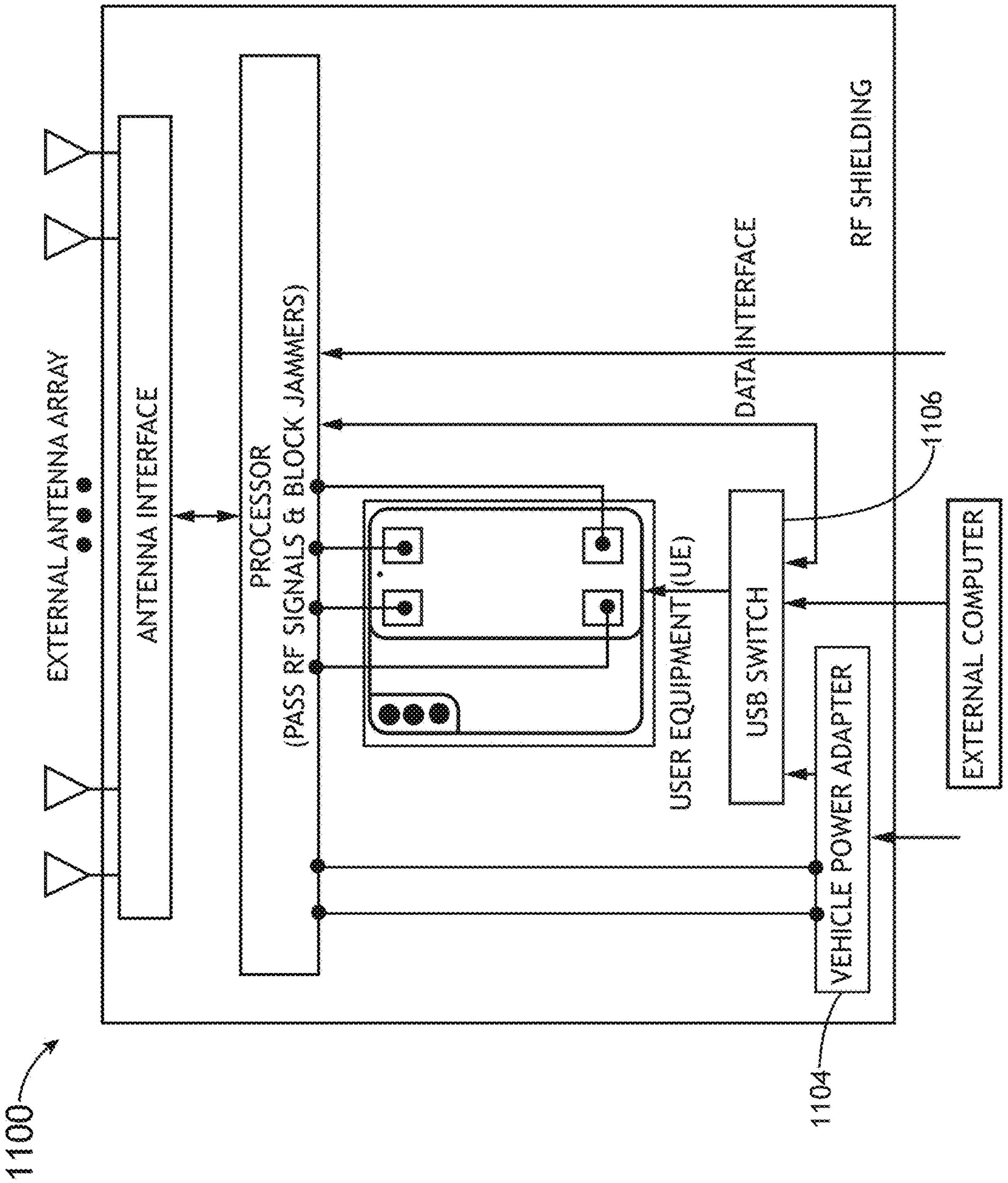
FIG. 11 shows a block diagram of a system to enable cellular connectivity with jamming protection according to an exemplary embodiment.

Referring to FIG. 11, a block diagram of a system to enable cellular connectivity with jamming protection according to an exemplary embodiment is shown. In at least one embodiment, an enclosure 1100 includes a common enclosed vehicle power adapter 1104 to engage a vehicle power supply to power the processor and antennas. A USB switch 1106 may be used to connect the cellular device to the vehicle power adapter 1104 or an external computer to allow a user to utilize the cellular communication functions of the cellular device within the enclosure 1100 as described herein. The enclosure 1100 may designed to meet shock, vibration, and environmental requirements of the platform.

Embodiments of the present disclosure may deliver gains on the order of 5 dBi with similar or better efficiencies as compared to existing cellular devices. Even with the same number of antennas as compared to the enclosed cellular device, embodiments may provide 2 dB of performance improvement. Embodiments may be broad-beam or narrow-beam. In a broad-beam configuration, the transmit and receive beams are very broad and include nulls in the direction of detected jamming sources. The cellular device may communicate with all tactical base stations in the vicinity while rejecting the jamming source.

In exemplary embodiments, the link budget accounts for 5 to 10 dB of adjacent cell interference margin as emissions spillage from neighboring base stations have to be accounted for. When configured for narrow-band operation, the transmit beam and receive beam may be tapered to point only to the desired base station. Additional information like base station ids and/or position location information derived from situational awareness data may be used. A configuration table includes a list of base station ids, in order of preference, to address kinetic attacks to base stations. Adjacent cell interference margins may be reduced to around 2 dB and the differential applied to increased communication range or higher data throughput.

Where a jamming source determines that cellular devices are still communicating even after being jammed, the jamming source may increase EIRP. The number of jamming sources, number external antenna elements, and angular proximity to desired base stations may determine jamming source rejection performance of the system. Typically, between 20 to 60 dB of jamming source signal rejection may be achieved, forcing jamming source to increase its EIRP by a factor of 100 or more to deny the synchronization/control signals.

When the jamming source spoofs OFDM signals, embodiments may utilize situation awareness data dissemination for identifying tactical base stations and potential location of jamming sources. Such situational awareness data enables embodiments to provide 20 dB to 60 dB jamming source signal rejection. Spoofing 5G channels precludes low duty-cycle high power jamming as these signals are repeated and the entire signal has to be generated across multiple subcarriers, raising the duty cycle substantially and forcing the jamming source to spread its power across many more subcarriers to break error correction coding. The jamming sources also have to become more complex as they have to implement substantial portions of the 5G standards to be recognized as a base station.

Embodiments of the present disclosure describe a multi-antenna shielded enclosure to filter out interference/jamming signals and present only the desired signal to a standard cellular device. The enclosure uses multiple signal detection algorithms like MUSIC/ESPRIT to detect base stations and jamming sources, discriminate between then, null the jamming signals, and provide the resultant interference free signal to the cellular device.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A cellular device enclosure comprising:
- a plurality of internal antennas disposed internal to the device enclosure;
- a plurality of external antennas disposed external to the device enclosure, a first set of external antennas comprising dedicated transmit antennas and a second set of external antennas comprising dedicated receive antennas; and
- at least one processor in data communication with the plurality of internal antennas, the plurality of external antennas, and a non-transitory memory storing non-transitory processor executable code for configuring the at least one processor to:
  - establish a connection to at least one cellular base station via the plurality of external antennas;
  - relay signal between the plurality of internal antennas and the at least one cellular base station;
  - identify one or more jamming sources;
  - determine a relative direction of each of the one or more jamming sources; and
  - determine one or more weights and phase adjustments to apply to each of the plurality of dedicated receive antennas to produce a null in a radiation pattern corresponding to relative direction of each of the one or more jamming sources, and determine one or more weights and phase adjustments to apply to each of the plurality of dedicated transmit antennas to produce a beam aimed at the at least one cellular base station, wherein:
- each of the plurality of internal antennas is disposed to correspond to an antenna on a cellular device within the enclosure; and
- the plurality of external antennas is a multiple between 2 and 32 of the plurality of internal antennas.

2. The cellular device of claim 1, wherein determining the relative location comprises a MUSIC algorithm.

3. The cellular device of claim 1, wherein determining the relative location comprises an ESPRIT algorithm.

4. The cellular device enclosure of claim 1, further comprising switching circuitry associated with each of the plurality of external antennas, the switching circuitry configured to place each external antenna in one of a transmit mode and receive mode.

5. The cellular device enclosure of claim 1, wherein the at least one processor is further configured to:
- establish a data link to an external computer;
- utilize the cellular device as a cellular modem for the external computer via the plurality of internal antennas and the plurality of external antennas.

6. A cellular system comprising:
- one or more base stations; and
- a cellular device enclosure comprising:
  - a plurality of internal antennas disposed internal to the device enclosure;
  - a plurality of external antennas disposed external to the device enclosure, a first set of external antennas comprising dedicated transmit antennas and a second set of external antennas comprising dedicated receive antennas; and
  - at least one processor in data communication with the plurality of internal antennas, the plurality of external antennas, and a non-transitory memory storing non-transitory processor executable code for configuring the at least one processor to:
    - establish a connection to the one or more cellular base stations via the plurality of external antennas;
    - relay signal between the plurality of internal antennas and the one or more cellular base stations;
    - identify one or more jamming sources;
    - determine a relative direction of each of the one or more jamming sources; and
    - determine one or more weights and phase adjustments to apply to each of the plurality of dedicated receive antennas to produce a null in a radiation pattern corresponding to relative direction of each of the one or more jamming sources, and determine one or more weights and phase adjustments to apply to each of the plurality of dedicated transmit antennas to produce a beam aimed at the at least one cellular base station, wherein:
- each of the plurality of internal antennas is disposed to correspond to an antenna on a cellular device within the enclosure; and
- the plurality of external antennas is a multiple between 2 and 32 of the plurality of internal antennas.

7. The cellular device of claim 6, wherein determining the relative location comprises a MUSIC algorithm.

8. The cellular device of claim 6, wherein determining the relative location comprises an ESPRIT algorithm.

9. The cellular system of claim 6, further comprising switching circuitry associated with each of the plurality of external antennas, the switching circuitry configured to place each external antenna in one of a transmit mode and receive mode.

10. The cellular system of claim 6, wherein the at least one processor is further configured to:
- establish a data link to an external computer;
- utilize the cellular device as a cellular modem for the external computer via the plurality of internal antennas and the plurality of external antennas.

11. An apparatus comprising:
- an enclosure;
- a plurality of internal antennas disposed internal to the enclosure;
- a plurality of external antennas disposed external to the enclosure, a first set of external antennas comprising dedicated transmit antennas and a second set of external antennas comprising dedicated receive antennas; and
- at least one processor in data communication with the plurality of internal antennas, the plurality of external antennas, and a non-transitory memory storing non-transitory processor executable code for configuring the at least one processor to:
  - establish a connection to one or more cellular base stations via the plurality of external antennas;

relay signal between the plurality of internal antennas and the one or more cellular base stations;

identify one or more jamming sources;

determine a relative direction of each of the one or more jamming sources; and determine one or more weights and phase adjustments to apply to each of the plurality of dedicated receive antennas to produce a null in a radiation pattern corresponding to relative direction of each of the one or more jamming sources, and determine one or more weights and phase adjustments to apply to each of the plurality of dedicated transmit antennas to produce a beam aimed at the at least one cellular base station, wherein:

each of the plurality of internal antennas is disposed to correspond to an antenna on a cellular device within the enclosure; and the plurality of external antennas is a multiple between 2 and 32 of the plurality of internal antennas.

12. The apparatus of claim 11, further comprising switching circuitry associated with each of the plurality of external antennas, the switching circuitry configured to place each external antenna in one of a transmit mode and receive mode.

13. The apparatus of claim 11, wherein the at least one processor is further configured to:

establish a data link to an external computer;

utilize the cellular device as a cellular modem for the external computer via the plurality of internal antennas and the plurality of external antennas.

14. The apparatus of claim 11, further comprising a re-chargeable battery within the enclosure configured to power the plurality of external antennas, the at least one processor, and the cellular device.

* * * * *